United States Patent Office 2,992,325
Patented July 11, 1961

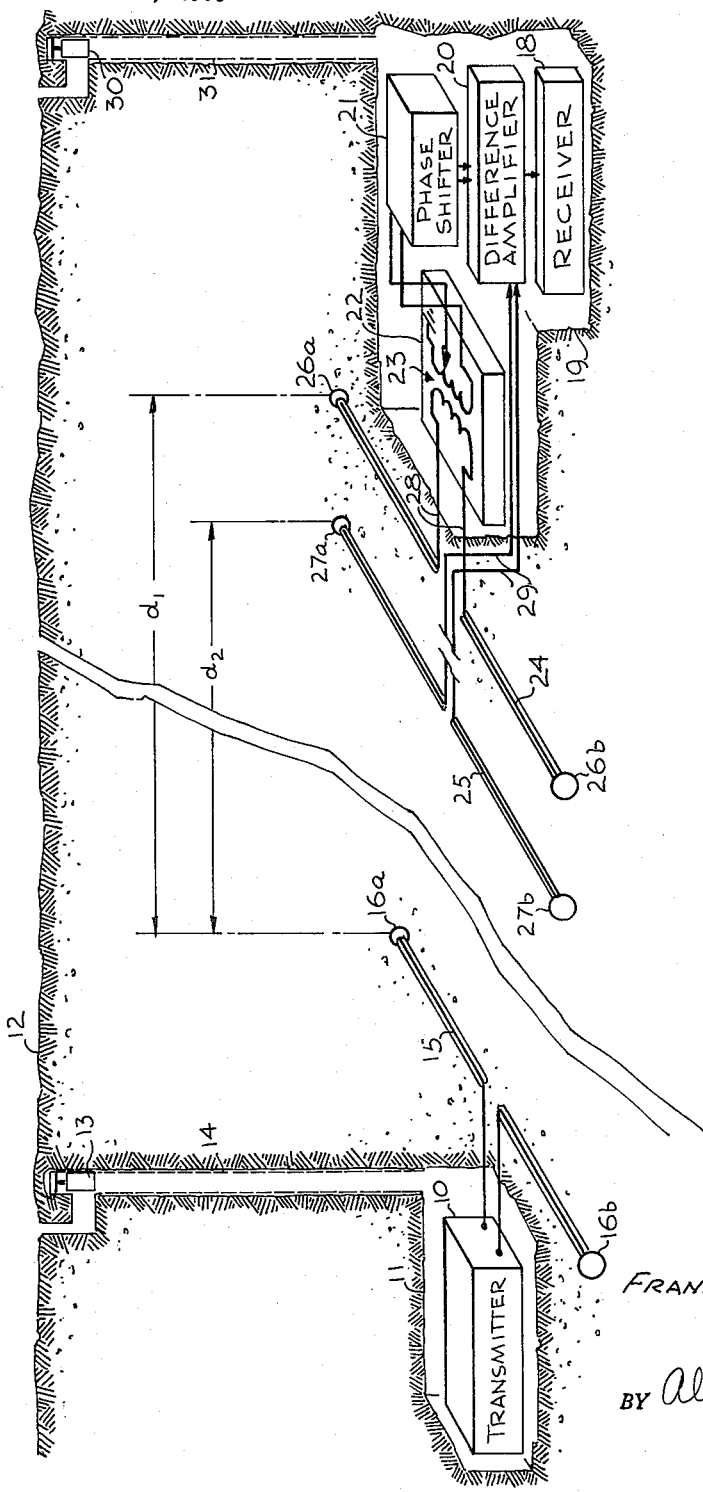

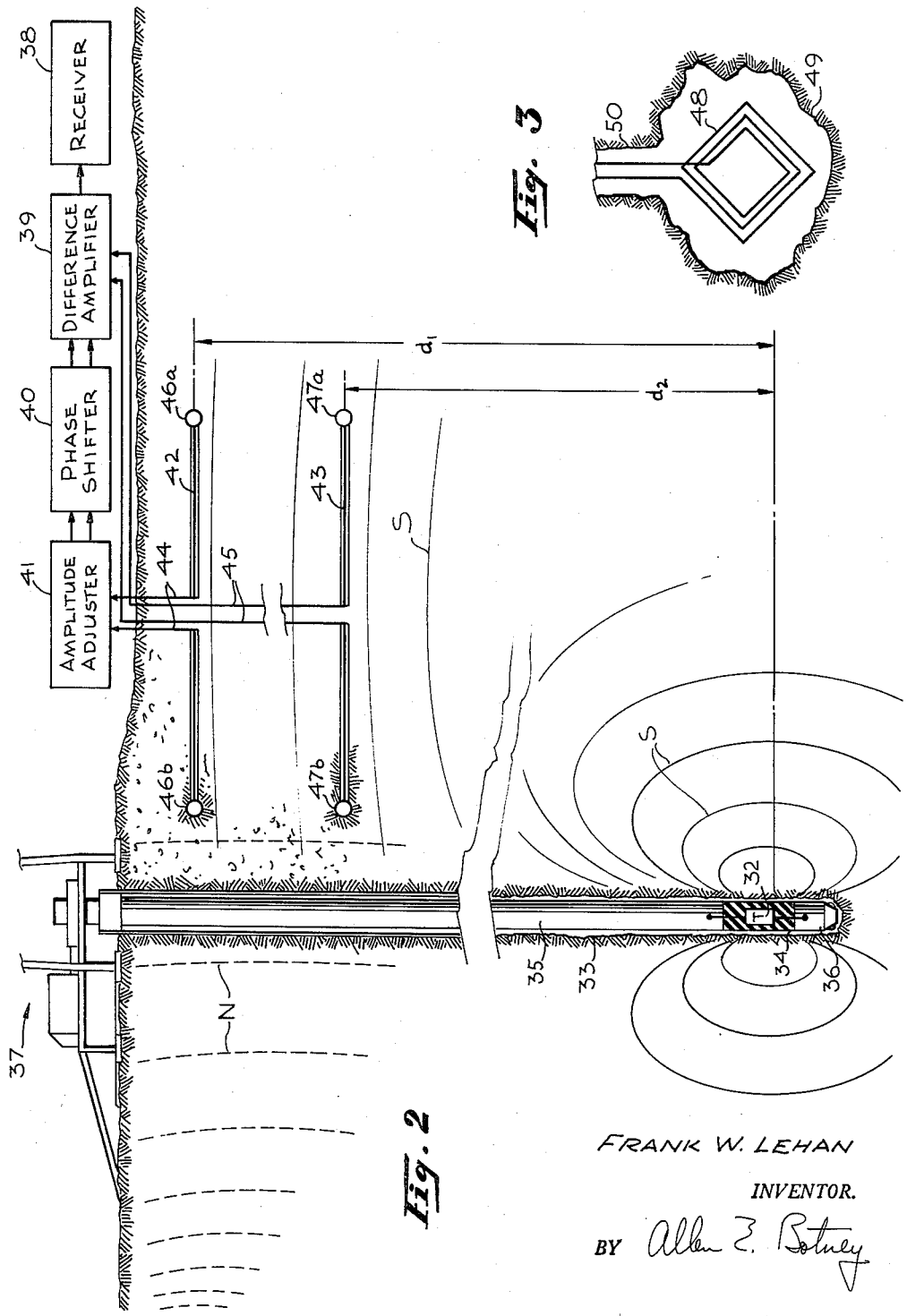

2,992,325
EARTH SIGNAL TRANSMISSION SYSTEM
Frank W. Lehan, Glendale, Calif., assignor to The Space Electronics Corporation, Glendale, Calif.
Filed June 1, 1959, Ser. No. 817,361
8 Claims. (Cl. 250—3)

The present invention relates to signal transmission systems in general and more particularly to a method and system for transmitting information in the form of electrical signals using the earth as a propagating medium.

It may be desirable for many reasons to transmit electrical signals through the earth as a propagating medium. In the well-logging and oil exploration arts, for example, electrical signals transmitted between two subsurface points may provide valuable information about subsurface strata and mineral deposits. Another example of the desirability of using the earth as a propagating medium may be found in the field of communications itself since subsurface communication links would, in general, be simpler, more effective, less expensive, and more permanent than existing conventional systems. More specifically, communication systems constructed on the surface of the earth are subject to the disruptive and destructive forces of both nature and man. Thus it is well known that phenomena such as sun spots will often disrupt communications for a significant period of time and that tornadoes, heavy snows and other such weather conditions will damage or destroy communication links, such as transmission lines, and communication installations. Furthermore, fires and explosions, both of which are encountered in times of war, also produce destructive effects of the types mentioned. In addition to the examples cited, still other good reasons exist for using the earth as a propagating medium for electrical signals and it will readily be seen that many advantages and benefits would flow from such use.

A major source of difficulty encountered in attempts thus far made to effectively use the earth as a medium for signal transmission is that of noise which has greatly interfered with the reception of the signals. Noise may stem from a variety of sources, such as from power or transmission lines in proximity to the earth and electrical or lightening storms. In the latter instance, interfering noise signals will be propagated through and beneath the surface of the earth for relatively great distances and, therefore, they must be contended with even though the weather immediately above any subsurface communication link is fair. In other words, lightning and other electrical discharges to earth are constantly occurring at different points along the earth's surface and although such discharges may occur at a considerable distance from any subsurface communication system, they nevertheless propagate for great distances through the earth and, therefore, constitute a primary and significant source of noise. It is obvious, therefore, from what has been said that there is a present need to provide an earth or subsurface signal transmission system that will effectively reduce the deleterious effects produced by such distant noise. The present invention provides such a system.

It is, therefore, an object of the present invention to provide a system for effectively transmitting electrical signals through the earth.

It is another object of the present invention to provide an earth signal transmission system that will operate unhampered by noise having distant origins.

It is a further object of the present invention to provide a method for enhancing the signal-to-noise ratio for signals transmitted through the earth.

Making use of the discovery that the propagative properties of the earth for electrical signals transmitted according to an intelligent pattern are different than those for noise, the present invention substantially overcomes the noise difficulties that have heretofore prevented the full and effective exploitation of the earth as a propagating medium. More specifically, the propagative properties are such that the transmitted signals are attenuated considerably more than the noise signals over the same distance so that, in accordance with the basic concept of the present invention, if signals received at two different subsurface points and containing both the desired signals and noise are subtracted from each other, the noise will substantially cancel out and thereby leave the desired signals substantially noise free.

More particularly, according to both an embodiment suited for well-logging purposes and another embodiment well adapted for communication purposes, a pair of antenna structures are positioned in the earth and they are spaced apart in such a manner that the desired electrical signals reach one antenna structure before the other. As a result, the information signals at the more distant antenna structure are significantly weaker than those received at the nearer antenna structure, whereas the noise received at both are substantially of equal strength. The output of the more distant antenna structure is then subtracted in a difference circuit from the output of the nearer antenna structure, whereby the signal-to-noise ratio is very greatly improved.

It will thus be apparent that the present invention offers an opportunity to fully realize the many features and advantages that are to be obtained through the use of subsurface signal transmission systems. Furthermore, it may be stated that in many respects these benefits may be derived more simply, more effectively and less expensively than with existing conventional systems.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only and are not intended as a definition of the limits of the invention.

FIG. 1 illustrates one embodiment of a signal transmission system according to the present invention; and FIG. 2 illustrates another embodiment of a signal transmission system according to the present invention.

Referring now to the drawings, there is shown in FIG. 1 a signal transmisison system which, in accordance with the present invention, is adapted for the transmission of messages in the form of electrical signals through the earth and for their relatively noise-free reception. As shown, the system comprises a transmitter 10 that is preferably mounted in an underground bunker 11 which may be reached from the earth's surface 12 via an elevator 13 that moves along a vertical shaft or passageway 14. Transmitter 10 is a standard piece of equipment, its circuitry depending almost entirely upon the type of modulation employed and power requirements of the system. Along these lines, it should be mentioned that almost every kind of modulation can be used advantageously but that pulse code modulation is preferred. The output end of transmitter 10 is coupled to an antenna 15 which is insulated from the earth along its entire length except, however, at its ends whereat the antenna is grounded. In order to obtain a good ground connection, metal spheres 16a and 16b are respectively mounted on the ends of the antenna, the spheres making good contact with the earth around them. Antenna 15 may be as much as several hundred feet from transmitter 10 and, in consequence thereof, the coupling between antenna and transmitter is preferably achieved by means of a pair of cables 17.

The system also includes a receiver 18 mounted in an underground bunker 19 located at a considerable distance from the above-described transmitter station. Receiver 18 is conventional and, like transmitter 10, its circuitry depends upon the type of signal modulation utilized. A number of circuits precede receiver 17, namely, a difference amplifier 20, a phase shifter circuit 21 and an amplitude adjuster circuit 22. Phase shifter circuit 21 is connected between amplitude adjuster circuit 22 and difference amplifier 20, the output terminals of the difference amplifier being connected to the receiver. As its name implies, amplitude adjuster 22 is used to vary or adjust the amplitude of signals applied to it and it may take any one of several different well known forms. The amplitude adjuster shown in FIG. 1 is a transformer, generally designated 23, whose secondary winding is center-tapped to provide the desired amplitude regulation. The secondary winding is also grounded at one end, the other end and the center-tap constituting the input to phase shifter 21.

The primary winding of transformer 23 is connected to one of two antennas 24 and 25, the other of the two antennas being connected to difference amplifier 20. More specifically, antenna 24 is connected to the transformer winding and antenna 25 is connected to the difference amplifier. Antennas 24 and 25 are also entirely insulated from the earth except at their ends, metal spheres 26a, 26b, 27a and 27b being mounted as shown to provide the desired grounding of the antenna ends.

The antennas are spaced apart from each other, the distance between them being as much as several hundred feet or even several miles. Moreover, they may also be spaced from the receiver site by like distances. Accordingly, as before, each antenna is coupled to the apparatus in bunker 19 by means of a pair of cables, the cables intercoupling antenna 24 and transformer 23 being designated 28 and the cables intercoupling antenna 25 and difference amplifier 20 being designated 29. Again, as before, access to bunker 19 is available by means of an elevator 30 moving along vertical passageway 31.

Before proceeding to describe the operation of the subject invention, it should be mentioned and understood that audio or low frequencies are involved here, such as 100 c.p.s., 1000 c.p.s., 10 kc. p.s. or 100 kc. p.s. It is also deemed worthwhile to briefly discuss the underlying doctrine involved. Stated more specifically, it was discovered through experiment that information signals are attenuated differently than noise signals originating at a distance when they are propagated through the earth, the information signals being attenuated much more rapidly than the noise as the distance from the transmitter is increased. More particularly, it was discovered that the strength of the information signals decreased according to the cube of the distance from the transmitter whereas the noise decreased very much less with distance. As a result of the facts discovered, it has become possible to substantially cancel out such noise at the receiver site by receiving both the information and noise signals at two different points and then subtracting one from the other.

The essence of what has been stated may be concisely presented through the medium of mathematics. Accordingly, the general equation for signal transmission between transmitter and receiver has been found to be $$E = \frac{Ile^{-j(2\pi/\lambda)d}}{2\pi\sigma d^3}\left[1-\left(\frac{2\pi d}{\lambda}\right)^2 + j\frac{2\pi d}{\lambda}\right] \quad (1)$$

where, $d$ is the distance between transmitter and receiver antennas;
$\lambda$ is the signal wavelength;
$\sigma$ is the conductivity of the earth;
$l$ is the length of the receiver antenna;
$I$ is the antenna current; and
$E$ is the voltage induced in the antenna.

It will be quite obvious to anyone skilled in this art that with the frequencies and distances being considered $$\frac{\lambda}{2\pi} \gg d$$

with the result that the second and third terms in the bracket of Equation 1 are quite small and may be taken out of the equation with practically no error. Accordingly, Equation 1 may be reduced to $$E = \frac{Il}{2\pi\sigma d^3} \quad (2)$$

For distances between receiver and transmitter antennas of $d_1$ and $d_2$ as shown in FIG. 1 of the drawings in the application, $$E_1 = \frac{Il}{2\pi\sigma d_1^3} \quad (3)$$

$$E_2 = \frac{Il}{2\pi\sigma d_2^3} \quad (4)$$

Subtracting Equation 3 from Equation 4, $$E_2 - E_1 = \frac{Il}{2\pi\sigma}\left(\frac{1}{d_2^3} - \frac{1}{d_1^3}\right)$$

which is the desired information signal out of difference amplifier 20 in said FIG. 1.

As for noise at any one frequency, the noise at a receiver antenna may be represented by the same mathematical equation, namely, $$E = \frac{K_n e^{-j(2\pi/\lambda)d}}{2\pi\sigma d^3}\left[1-\left(\frac{2\pi d}{\sigma}\right)^2 + j\left(\frac{2\pi d}{\sigma}\right)\right] \quad (5)$$

In this instance, however, $d$ is likely to be many thousands of miles and since there is a $d^3$ in the denominator of the term before the bracket, it will be apparent that the second term of the three in the bracket is all important. This is so because the other terms will have either a $d^2$ or a $d^3$ in the denominator when the equation is multiplied through, whereas the second term will have only a $d$ in the denominator. Consequently, the first and third terms will be very small as compared to the second term and, therefore, can be ignored with extremely little error. When this is done, the equation reduces to $$E = -\frac{K_n 2\pi e^{-j\left(\frac{2\pi}{\lambda}\right)d}}{\sigma\lambda^2 d} \quad (6)$$

For distances of $d_3$ and $d_4$ between the noise source and the antennas, $$E_3 = -\frac{K_n 2\pi e^{-j(2\pi/\lambda)d_3}}{\sigma\lambda^2 d_3} \quad (7)$$

$$E_4 = -\frac{K_n 2\pi e^{-j(2\pi/\lambda)d_4}}{\sigma\lambda^2 d_4} \quad (8)$$

Subtracting Equation 7 from Equation 8, $$E_4 - E_3 = -\frac{K_n 2\pi}{\sigma\gamma^2}\left[\frac{e^{-j(2\pi/\lambda)d_4}}{d_4} - \frac{e^{-j(2\pi/\lambda)d_3}}{d_3}\right] \quad (9)$$

which is the noise signal out of the difference amplifier. It will be recognized that since the two antennas are only a few hundred or at most a few thousand feet apart, $d_3$ is equal to $d_4$ for all practical purposes. Hence, Equation 9 reduces to zero, which means that the noise at the frequency being considered is cancelled out.

Considering now the operation of the system shown in FIG. 1, signals generated in transmitter 10 and radiated by antenna 15 are intercepted first by receiver antenna 25 and subsequently intercepted by receiver antenna 24. The signals thereby induced in the two antennas are passed to difference amplifier 20, the signals from antenna 25 first passing through amplitude adjuster 22 and phase shifter 21. In the difference amplifier, the signals out of antenna 24 are subtracted from the signals out of antenna 25 to produce a difference signal which, it will now be recognized, is the information signal transmitted by transmitter 10. The amplitude adjuster and phase shifter are used to adjust the amplitude and phase of signals out of antenna 25 to better cancel the noise signals that may accompany the information signals. An adjustment in phase may be required to obtain a noise null because, among other reasons, of the difference in the lengths of cables 28 and 29 which may shift the phase of the noise signals relative to each other and thereby prevent optimum noise reduction. In receiver 18, the information signals out of difference amplifier 20 are demodulated and amplified to put them in usable form. It is thus seen that as a result of the discovery of the propagative properties of the earth, a new and novel system was devised, as shown and described above, for the effective transmittal of messages or other information signals.

Another system according to the present invention that may be used with good effect to determine the properties and characteristics of the earth and to help determine also the location of mineral deposits is shown in FIG. 2. As shown, the system comprises a transmitter 32 positioned in a long shaftway 33 dug into the ground and which may be an oil well. As is well known, shaftways of this type may be as much as several thousand feet long. The transmitter is encased in an insulative material 34 to safeguard it against corrosion and other damage which may be caused by the earth's dampness, pressure, etc. Furthermore, transmitter 32 is electrically connected by means of suitable cabling to a drill pipe 35 and a drill bit 36, both of which are normally employed in any drilling operation. The drill pipe and drill bit together constitute an antenna arrangement as indicated by waves S being radiated outwardly. Aboveground, over the well and in the proximity of it, is located the various types of drilling equipment which generally includes various kinds of electrical apparatus, such as generators and motors. The drilling equipment as a whole is generally designated 37.

Preferably positioned on the earth's surface and in the general area of equipment 37 is receiver apparatus comprising a receiver 38, a difference amplifier 39, a phase shifter circuit 40, and an amplitude adjuster circuit 41. Buried in the earth is a pair of antennas 42 and 43. As before, phase shifter 40 is connected between difference amplifier 39 and amplitude adjuster 41, the output end of the difference amplifier being connected to the receiver. Antenna 42 is connected to amplitude adjuster 41 via a pair of cables 44 and through the amplitude adjuster and phase shifter 40 to diference amplifier 39 whereas antenna 43 is coupled by means of cables 45 directly to the difference amplifier. Again, in order to make good contact with the earth, the ends of antenna 42 respectively have mounted thereon a pair of electrically conductive spheres 46a and 46b. Similarly, a pair of metal spheres 47a and 47b are respectively mounted on the ends of antenna 43. Both antennas are insulated from the earth intermediate their ends.

Considering antennas 42 and 43 still further, both antennas are preferably positioned in a substantially horizontal position with one antenna being above the other, the separation between the antennas possibly being as much as several hundred feet or more. One antenna, antenna 42 in the figure, may be within several feet of the earth's surface. On the other hand, the vertical spacing between the lower of the two antennas, antenna 43 in the figure, and transmitter 32 is likely to be several hundred feet and possibly several thousand feet. The spacings between antennas 42 and 43 and transmitter 32 are respectively indicated as distances $d_1$ and $d_2$ in the figure.

The operation of the system of FIG. 2 is basically the same as that of the system of FIG. 1. Hence, information signals radiated by the apparatus of transmitter 32 are intercepted first by antenna 43 and later intercepted by antenna 42. As a result, in accordance with the principles previously stated, the signals out of antenna 42 are significantly smaller in amplitude than those out of antenna 43. On the other hand, noise signals, which may be due to atmospheric conditions and whose wavefronts are indicated by the letter N, are received simultaneously by the antennas and, therefore, are of substantially equal strength at both. Consequently, when the signals out of the antennas are subtracted from each other in difference amplifier 39, the noise is substantially cancelled out while the desired information signals remain. These are later demodulated and amplified in receiver 38. Optimum results may be obtained in the manner previously indicated, namely, through the use of amplitude adjuster 41 and phase shifter 40. Thus, with the aid of the present invention, data may be obtained concerning the subsurface properties and constituents of the earth and this can be done effectively since the hampering effects of noise are very substantially reduced by it.

Although the embodiments of the present invention have been shown and described in connection with the use of dipole-like antennas, it will be recognized by those skilled in the art that other types of antennas, such as loop antennas, may be used with equally good effect. A loop antenna 48 positioned in a hole 49 in the earth is shown in FIG. 3. The loop antenna is gotten into the hole through a passageway 50 connecting with it, the antenna being in a collapsed condition when lowered from the surface of the earth and expanded to its full diameter or area once in the hole. The hole itself is made by lowering an explosive to the bottom of passageway 50 and then setting it off. The proper amount of earth is then scooped out to make room for the antenna. Finally, it should be mentioned that loop antenna 48 and any others that may be used are insulated from the earth around it.

Having thus described the invention, what is claimed as new is:

1. A subsurface signal transmission system capable of substantially reducing noise that is caused by distant atmospheric electrical discharges and that ordinarily interferes with the reception of signals transmitted at relatively low frequencies, said system comprising: transmitter apparatus adapted for transmitting electrical signals beneath the surface of the earth; and receiver apparatus for receiving said electrical signals, said receiver apparatus including a receiver, two antennas and a difference circuit coupled between the receiver and each of the two antennas, said two antennas being positioned below the surface of the earth and spaced apart from each other in such a manner that said transmitted signals are intercepted by one of said antennas before the other, said difference circuit subtracting the signals intercepted by said other antenna from the signals intercepted by said one antenna to apply difference signals to said receiver that are relatively free from external noise intercepted by said antennas.

2. The system defined in claim 1 wherein said system further includes amplitude adjuster and phase shifter circuits for respectively adjusting the magnitude and phase of noise signals intercepted by said one antenna to substantially cancel noise signals intercepted by said other antenna when one is subtracted from the other in said difference circuit.

3. A subsurface signal transmission system capable of substantially reducing noise that is caused by distant atmospheric electrical discharges and that ordinarily interfere with the reception of signals transmitted at relatively low frequencies, said system comprising: transmitter apparatus including a transmitter for generating predetermined electrical signals and an antenna adapted for radiating said electrical signals through the ground, said antenna being positioned beneath the surface of the earth and insulated therefrom intermediate its ends, the ends of said antenna being connected to ground; and receiver apparatus for receiving said electrical signals, said receiver apparatus including a receiver, first and second antennas and a difference circuit coupled between said receiver and said first and second antennas, said first and second antennas being positioned beneath the surface of the earth and insulated therefrom intermediate their ends, said ends being connected to ground, said first and second antennas being spaced apart in such a manner that said electrical signals are intercepted by said first antenna before they are intercepted by said second antenna, whereby the electrical signals induced in said second antenna are weaker than those induced in said first antenna, said difference circuit subtracting the signals induced in said second antenna from the signals induced in said first antenna to apply difference signals to said receiver that are substantially free from external noise intercepted by said antennas.

4. The system defined in claim 3 wherein said system further includes amplitude adjuster and phase shifter circuits for respectively adjusting the magnitude and phase of noise signals intercepted by said first antenna to substantially cancel noise signals intercepted by said second antenna when one is subtracted from the other in said difference circuit.

5. In a subsurface signalling system, apparatus for substantially eliminating noise signals that are caused by distant atmospheric electrical discharges and that ordinarily interfere with the reception of information signals transmitted through the earth at relatively low frequencies, said apparatus comprising: first and second antennas positioned beneath the surface of the earth and insulated therefrom intermediate their ends, said ends being connected to ground, said first and second antennas being spaced apart in such a manner that the information and noise signals are intercepted by said first antenna before they are intercepted by said second antenna, whereby the information signals induced in said second antenna are weaker than those induced in said first antenna; and a difference circuit coupled to said first and second antennas for subtracting the signals induced therein from each other to produce output information signals that are substantially free from the noise signals intercepted by said antennas.

6. The apparatus defined in claim 5 wherein said apparatus further includes amplitude adjuster and phase shifter circuits for respectively adjusting the magnitude and phase of noise signals intercepted by said first antenna to produce optimum cancellation of the noise signals.

7. In a subsurface signalling system, apparatus for substantially eliminating noise signals that are caused by distant atmospheric electrical discharges and that ordinarily interfere with the reception of information signals transmitted through the earth at relatively low frequencies, said apparatus comprising: first and second loop antennas positioned beneath the surface of the earth and insulated therefrom, said loop antennas being spaced apart in such a manner that the information and noise signals are intercepted by said first loop antenna before they are intercepted by said second loop antenna, whereby the information signals induced in said second antenna are weaker than those induced in said first antenna; and a difference circuit coupled to said first and second loop antennas for subtracting the signals induced therein from each other to produce output information signals that are substantially free from the intercepted noise signals.

8. A subsurface signal transmission system capable of substantially eliminating noise signals that are caused by distant atmospheric electrical discharges and that ordinarily interfere with the reception of signals transmitted at relatively low frequencies, said system comprising: transmitter apparatus including a transmitter for generating electrical information signals and a loop antenna positioned beneath the surface of the earth, said loop antenna being coupled to said transmitter for radiating said information signals through the earth; and receiver apparatus for receiving said information signals, said receiver apparatus including a receiver, first and second loop antennas and a difference circuit coupled between said receiver and said first and second loop antennas, said first and second loop antennas being positioned beneath the surface of the earth and insulated therefrom and spaced apart in such a manner that the information and noise signals are intercepted by said first antenna before they are intercepted by said second antenna, whereby the information signals induced in said second antenna are weaker than those induced in said first antenna, said difference circuit subtracting the signals induced in said second loop antenna from the signals induced in said first loop antenna to apply output information signals to said receiver that are substantially free from noise signals intercepted by said antennas.

References Cited in the file of this patent

UNITED STATES PATENTS

| | | |
|---|---|---|
| 1,470,430 | Ellison | Oct. 9, 1923 |
| 2,226,836 | Sinninger | Dec. 31, 1946 |
| 2,499,195 | McNiven | Feb. 28, 1950 |
| 2,650,297 | Damron | Aug. 25, 1953 |
| 2,901,687 | Barret | Aug. 25, 1959 |